F. M. SPAYD.
ATTACHMENT FOR BAND SAW MACHINES.
APPLICATION FILED APR. 24, 1908.
931,894.
Patented Aug. 24, 1909.
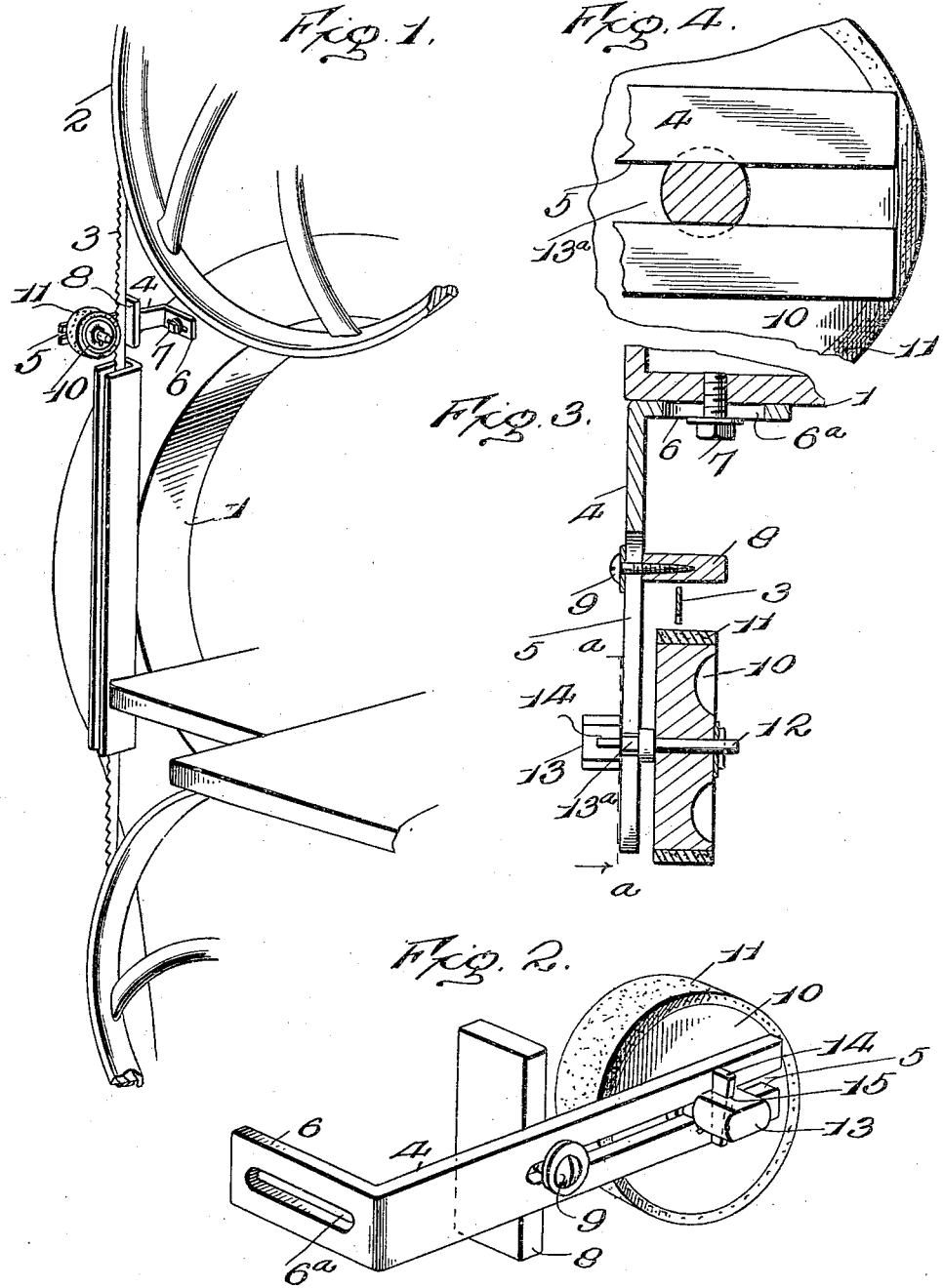
Inventor
Francis M. Spayd

UNITED STATES PATENT OFFICE.

FRANCIS M. SPAYD, OF MANISTEE, MICHIGAN.

ATTACHMENT FOR BAND-SAW MACHINES.

931,894.  Specification of Letters Patent.  Patented Aug. 24, 1909.

Application filed April 24, 1908. Serial No. 429,018.

*To all whom it may concern:*

Be it known that I, FRANCIS M. SPAYD, citizen of the United States, residing at Manistee, in the county of Manistee and State of Michigan, have invented certain new and useful Improvements in Attachments for Band-Saw Machines, of which the following is a specification.

The present invention is in the nature of an attachment for band saw machines whereby the saw is prevented from running off the pulleys or guide wheels around which it extends.

The object of the invention is the provision of an attachment of this character which is simple in its construction, can be readily applied to a band saw machine of any conventional type, and which will tend to prolong the life of the saw by preventing the same from running hot on the back with the resultant crystallization of the metal.

For a full understanding of the invention and the merits thereof and also to acquire a knowledge of the details of construction and the means for effecting the result, reference is to be had to the following description and accompanying drawings, in which:

Figure 1 is a perspective view of a portion of a band saw machine showing the attachment applied thereto. Fig. 2 is a perspective view of the band saw attachment when removed from the machine. Fig. 3 is a longitudinal sectional view through the same. Fig. 4 is an enlarged sectional view on the line *a—a* of Fig. 3.

Corresponding and like parts are referred to in the following description and indicated in all the views of the drawings by the same reference characters.

For the purpose of illustration the attachment is shown as applied to a band saw machine which is of the conventional construction and comprises a frame 1 having an upper pulley or guide wheel 2 journaled thereon around which the band saw 3 extends, a lower pulley being utilized in connection with the upper pulley 2 to properly guide the saw. The attachment comprises a bracket 4 which is detachably applied to the frame of the band saw machine and carries guide members adapted to coöperate with each other to prevent the band saw running off the pulleys of the machine. The outer portion of the bracket 4 is slotted at 5 while the inner end of the bracket is formed with a flange 6 adapted to fit against the frame 1 and to be secured thereto by means of a bolt 7 or similar fastening member passing through a slot $6^a$ therein. This slot $6^a$ enables a limited amount of lateral adjustment of the bracket upon the frame for the purpose of holding the guide members carried thereby in proper relation to the saw.

A guide block 8 adapted to engage the back of the saw to prevent the saw running off the rear side of the pulley is adjustably mounted upon the bracket 4 by means of a clamping bolt 9 extending through the slot 5 in the outer portion of the bracket. Coöperating with this guide block 8 is a wheel 10 which is also carried by the bracket 4 and is designed to engage the toothed edge of the band saw to prevent the latter running off the forward side of the pulley 2. This wheel 10 is provided with a peripheral band 11 of some yielding material such as rubber and is set so as to be slightly spaced from the toothed edge of the saw when the machine is running under normal conditions. However, as soon as the saw meets with some unusual obstruction tending to cause the same to slip off the forward side of the pulley 2 the toothed edge of the saw comes into contact with the peripheral band 11 of the wheel 10 and the latter is caused to revolve, the soft band 11 preventing injury to the saw teeth. In this manner it will be obvious that the saw will be effectively prevented from running off the pulley by means of the guide block 8 which is adapted to engage the back of the saw and the guide wheel 10 adapted to engage the front or toothed edge of the saw. Specifically describing the manner of mounting the wheel 10 it will be observed that the same is journaled upon a spindle 12 projecting from a slide 13 adjustably mounted within the slotted portion 5 of the bracket. In the present instance an intermediate portion $13^a$ of the slide is reduced so as to fit within the slot 5 and this reduced portion is flattened to prevent rotation of the slide. Any suitable means may be utilized for locking the slide in an adjusted position and for this purpose a wedge-shaped key 14 is shown upon the drawing, the said key fitting within a slot 15 in the slide 13.

From the foregoing description it will be readily apparent that when the key 14 is removed the slide 13 can be adjusted within the slot 5 to move the guide wheel 10 toward or away from the guide block 8, and that by loosening the clamping bolt 9 the guide block 8 itself may be moved toward or away from the frame of the machine as may be required.

Having thus described my invention, what is claimed as new is:

1. In an attachment for band saw machines, the combination of a bracket adapted to be applied to the machine and provided with a slot, a slide having an intermediate portion thereof reduced and loosely received within the slot, a wedge shaped key applied to the slide for coöperation with the bracket to lock the slide in an adjusted position within the slot, a guide wheel carried by the slide, and means upon the bracket for coöperation with the guide wheel to hold the saw against displacement.

2. In an attachment for a band saw machine, the combination of a bracket adapted to be applied to the machine and provided with a slot, a slide mounted upon the bracket and having an intermediate portion thereof reduced in cross section and loosely received within the slot, a transversely disposed wedge shaped key passing through the slide adjacent the reduced intermediate portion thereof and adapted to have a wedge engagement with the bracket for locking the slide against movement within the slot, a guide wheel carried by the slide, and means upon the bracket for coöperation with the guide wheel to hold the saw against displacement.

In testimony whereof I affix my signature in presence of two witnesses.

FRANCIS M. SPAYD. [L. S.]

Witnesses:
 CHAS. LINDHOLM,
 WM. E. HAGGETT.